(12) United States Patent
Prakash et al.

(10) Patent No.: US 10,110,438 B2
(45) Date of Patent: Oct. 23, 2018

(54) CONTROL PLANE DISCOVERY OF SERVICES

(71) Applicant: Ciena Corporation, Hanover, MD (US)

(72) Inventors: Anurag Prakash, Noida (IN); Mohit Chhillar, Delhi (IN); Dominic Richens, Ontario (CA); Seemant Bisht, Gurgaon Haryana (IN)

(73) Assignee: Ciena Corporation, Hanover, MD (US)

( * ) Notice: Subject to any disclaimer, the term of this patent is extended or adjusted under 35 U.S.C. 154(b) by 116 days.

(21) Appl. No.: 14/961,352

(22) Filed: Dec. 7, 2015

(65) Prior Publication Data

US 2017/0163489 A1 Jun. 8, 2017

(51) Int. Cl.
*H04L 12/24* (2006.01)
*H04B 10/27* (2013.01)
*H04J 14/02* (2006.01)

(52) U.S. Cl.
CPC ............. *H04L 41/12* (2013.01); *H04B 10/27* (2013.01); *H04J 14/0227* (2013.01)

(58) Field of Classification Search
CPC ................................ H04L 41/12; H04B 10/27
See application file for complete search history.

(56) References Cited

U.S. PATENT DOCUMENTS

| | | | |
|---|---|---|---|
| 9,307,302 B2 * | 4/2016 | Ben-Shahar | H04Q 11/0005 |
| 2002/0131103 A1 * | 9/2002 | Bambos | H04J 14/0227 |
| | | | 398/58 |
| 2002/0141444 A1 * | 10/2002 | Kano | H04L 45/10 |
| | | | 370/468 |
| 2003/0067880 A1 * | 4/2003 | Chiruvolu | H04J 14/0227 |
| | | | 370/237 |
| 2003/0215232 A1 * | 11/2003 | Jahn | H04J 14/02 |
| | | | 398/41 |

* cited by examiner

*Primary Examiner* — Alex Skripnikov
*Assistant Examiner* — Sharmin Chowdhury
(74) *Attorney, Agent, or Firm* — Clements Bernard Walker PLLC; Christopher L. Bernard; Lawrence A. Baratta, Jr.

(57) ABSTRACT

A method for control plane discovery includes a plurality of network elements transmitting an outbound control plane communication to generate path information of a path through the network elements. The transmitting includes receiving, by an intermediate network element of the network elements, the outbound control plane communication on an optical layer ingress port, appending, by the intermediate network element, an intermediate network element identifier of the intermediate network element to the path information in the outbound control plane communication, and transmitting, by the intermediate network element, the outbound control plane communication via an electrical layer egress port based on the intermediate network element comprising a layer changing drop port. The method further includes the network elements receiving via the path, the path information via a returned control plane communication, storing the path information in the returned control plane communication, and operating a control plane using the path information.

20 Claims, 5 Drawing Sheets

CONTROL PLANE DISCOVERY OF SERVICES

BACKGROUND

A network is an interconnection of various devices. Some devices are end user devices, and other devices are network elements, such as edge devices and intermediate devices. Different mechanisms exist for management of a network. For example, a network may be managed using a centralized management scheme, whereby each network element obtains management and services information from a centralized manager. By way of another management scheme, the network may be managed using a control plane. A control plane is a distributed management scheme, whereby each network element maintains the control plane and manages the network accordingly.

SUMMARY

In general, in one aspect, one or more embodiments relate to a method for control plane discovery. The method includes a plurality of network elements transmitting an outbound control plane communication to generate path information of a path through the network elements. The transmitting includes receiving, by an intermediate network element of the network elements, the outbound control plane communication on an optical layer ingress port, appending, by the intermediate network element, an intermediate network element identifier of the intermediate network element to the path information in the outbound control plane communication, and transmitting, by the intermediate network element, the outbound control plane communication via an electrical layer egress port based on the intermediate network element comprising a layer changing drop port. The method further includes the network elements receiving via the path, the path information via a returned control plane communication, storing the path information in the returned control plane communication, and operating a control plane using the path information.

In general, in one aspect, one or more embodiments relate to a system for control plane discovery including network elements. The network elements are configured to perform functionality comprising transmitting an outbound control plane communication to generate path information of a path through the network elements. The transmitting includes receiving, by an intermediate network element of the network elements, the outbound control plane communication on an optical layer ingress port, appending, by the intermediate network element, an intermediate network element identifier of the intermediate network element to the path information in the outbound control plane communication, and transmitting, by the intermediate network element, the outbound control plane communication via an electrical layer egress port based on the intermediate network element comprising a layer changing drop port. The functionality further includes the network elements receiving via the path, the path information via a returned control plane communication, storing the path information in the returned control plane communication, and operating a control plane using the path information.

In general, in one aspect, one or more embodiments relate to an intermediate network element comprising an integrated circuit configured to perform functionality including transmitting an outbound control plane communication to generate path information of a path through network elements that include the intermediate network element. The transmitting includes receiving, by the intermediate network element of the network elements, the outbound control plane communication on an optical layer ingress port, appending, by the intermediate network element, an intermediate network element identifier of the intermediate network element to the path information in the outbound control plane communication, and transmitting, by the intermediate network element, the outbound control plane communication via an electrical layer egress port based on the intermediate network element comprising a layer changing drop port. The functionality further includes receiving, via the path, the path information via a returned control plane communication, storing the path information in the returned control plane communication, and operating a control plane using the path information.

Other aspects of the invention will be apparent from the following description and the appended claims.

DETAILED DESCRIPTION

Figure 1:
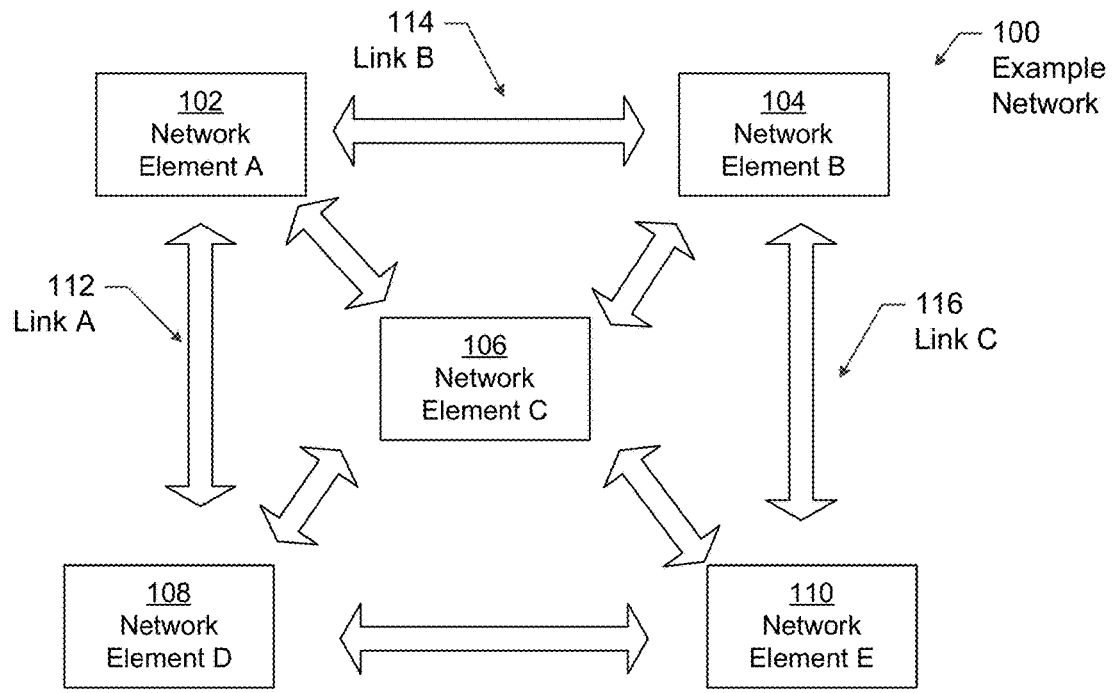
FIGS. 1 and 2 show diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to deploying a control plane on a network. When first deploying a control plane on an existing dense wavelength division multiplexing (DWDM) network, the existing services are replaced with control plane managed connections. One or more embodiments manage the replacement by not only include same networking layer cross connects in the discovery, but also cross connects between an optical layer and an electrical layer. In particular, by traversing the network and not stopping at layer changing cross connects, such as regeneration sites, one or more embodiments may derive an end-to-end path for a service.

FIG. 1 is a diagram of a network (100) in accordance with one or more embodiments of the invention. As shown in FIG. 1, a network is an interconnection of network elements (e.g., network element A (102), network element B (104), network element C (106), network element D (108), network element E (110)). Each network element is a physical device that provides a connection between other physical devices on a network. For example, a network element may be an optical switch, router, hub, or any other such physical device that connects other physical devices together. By way of an example a physical device, network element may be a collection of blades that are connected via fiber or electrical lines together, and may be collocated in a rack. One of the blades on a network element may be primary and executes a control plane.

In one or more embodiments of the invention, network elements may be connected via optical connections and/or electrical connections. For example, the optical connections may be an interconnection using optical links or optical cross connects. Electrical connections may be layer 1 or layer 2 connections.

In one or more embodiments, a control plane (not shown) in the network (100) maintains various paths between the network elements for services. A path is a set of connections from a source endpoint (e.g. a network element) to a destination endpoint (e.g., another network element). Once path has been established, the source endpoint may communicate over the network with the destination endpoint. For example, path may have network element E (110) as a source endpoint and network element D (108) as the destination endpoint. As such, various logical paths may be selected to establish the end-to-end connection between the two network elements, such as, for example, link C (116), network element B (104), link B (114), network element A (102), link A (112), and network element D (108). A path may extend from an optical portion of a network and an electrical portion of the network. In other words, various links in the path may be optical and other links in the path may be electrical.

Figure 2:
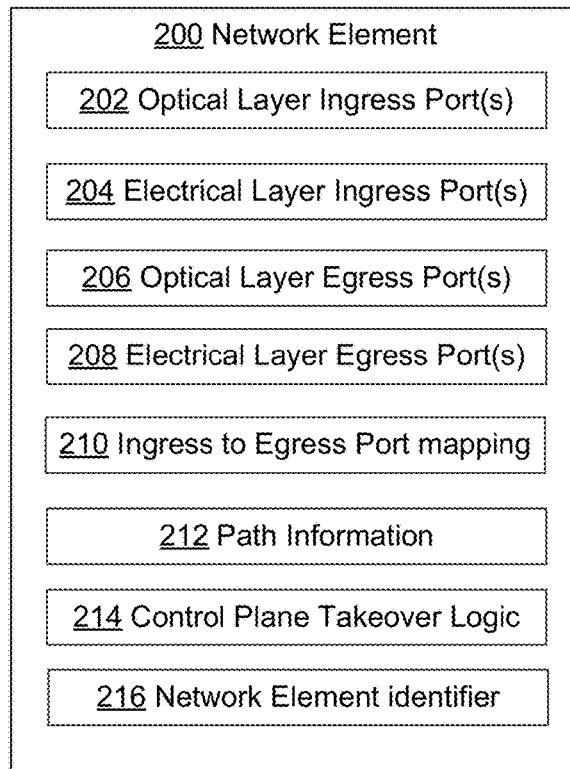

FIG. 2 is a diagram of a network element (200) in accordance with one or more embodiments of the invention. As shown in FIG. 2, the network element (200) may include any combination of the following components: one or more optical layer ingress ports (202), one or more electrical layer ingress ports (204), one or more optical layer egress ports (206), one or more electrical layer ingress ports (208), and an ingress to egress port mapping (210), path information (212), and control plane takeover logic (214). Further, different network elements may have different combinations of the above components. Each of these components is described below.

In one or more embodiments of the invention, optical layer ingress port(s) (202) are one or more physical ports that include functionality to receive an optical signal from an optical link. In other words, the optical layer ingress ports are optical ports that receive a signal. More particularly, an optical layer ingress port is a port on the network element (200) that receives the optical signal from a network (e.g., from another network element). In one or more embodiments of the invention, the optical signal may be a combined DWDM signal. In other words, the received optical signal may be a combination of multiple optical signals on different wavelengths. A service may have a dedicated wavelength for an optical signal that is received by the optical layer ingress ports. Further, the wavelength for the same service may vary between network elements that are in the path.

In one or more embodiments of the invention, electrical layer ingress port(s) (204) are one or more physical ports that include functionality to receive an electrical signal from a network or from another port on the network element (200). The electrical signal may be a layer 1 signal or a layer 2 signal. In other words, the electrical layer ingress port may be a layer 1 port for receiving a layer 1 signal and/or a layer 2 port for receiving a layer 2 signal.

In one or more embodiments of the invention, optical layer egress port(s) (206) are one or more physical ports that include functionality to transmit an optical signal on an optical link. In other words, the optical layer egress ports are optical ports that send a signal. In one or more embodiments of the invention, an optical layer egress port is a port on the network element (200) that sends the optical signal to a network (e.g., to another network element). In one or more embodiments of the invention, the optical signal transmitted may be a combined DWDM signal.

In one or more embodiments of the invention, electrical layer egress port(s) (208) are one or more physical ports that include functionality to transmit an electrical signal from a network or from another port on the network element (200). As with the electrical layer ingress port, the electrical layer egress port may be configured to transmit a layer 1 and/or a layer 2 signal.

In one or more embodiments of the invention, ingress to egress port mapping (210) is a set of one or more data structures that map ingress ports to egress ports. The data structures may correspond to a collection of one or more tables that maintain routing information. In other words, the ingress to egress port mapping (210) may include an identifier of an ingress port, an identifier of an egress port, and one or more service identifiers for services to which the mapping is valid. The mapping may further include functionality to maintain wavelength information for each service and egress port.

Further, the mapping may include information as to whether the network element corresponds to a regeneration network element, a terminating network element, or other network element. A regeneration network element is a network element that converts the optical signal to an electrical signal and then back to an optical signal. For example, an electrical card may convert between an open transport network (OTN) protocol and Ethernet or synchronous optical network (SONET) protocol. A regeneration network element may have one OTN card to another OTN card, in order to skip higher order protocols and translation, while at the same time regenerating the optical signal.

In one or more embodiments of the invention, the path information (202) is information describing a path through the network for a particular service. In other words, the path information includes an identifier of each connection or hop from an originating network element to a terminating network element. The originating network element is the edge device of the network that starts the path. The terminating network element is the edge device of the network that ends the path. In one or more embodiments of the invention, the path information may include, for each network element in the path, a network element identifier and an egress port identifier for the egress port of the path. Other data values may be used to maintain path information without departing from the scope of the invention. In one or more embodiments of the invention, path information may be a designated transit list (DTL), an explicit route object (ERO), or any other type of object that may maintain a path.

In one or more embodiments of the invention, control plane takeover logic (214) corresponds to hardware, software, firmware, or any combination thereof that includes functionality to deploy a control plane onto an existing DWDM network that lacks a control plane. In other words, the control plane takeover logic is configured to replace existing services with control plane managed services. A service is an end to end connection between devices in a network. In other words a service may be a channel or other such connection in the network. The control plane is hardware, software, firmware, or any combination thereof that includes functionality to controls aspects of configuring connections between optical switches along a network. The control plane may provide management at layer 0 (e.g., the photonic layer with multiplexing, amplification, optical routing, etc.), layer 1 (e.g., Synchronous Optical Network (SONET), Synchronous Digital Hierarchy (SDH), Optical Transport Network (OTN) and/or Layer 2 (e.g., Ethernet) and can operate the control plane. For example, the control plane may automatically handle path generation, updates across the network for link failure, route selection, virtual private network (VPN) management to maintain restrictions on paths of a particular VPN, and other services. By way of a more specific example, the control plane may control configurable features of the network, such as automating discovery of the network elements, capacity on the links, port availability on the network elements, connectivity between ports, dissemination of topology and bandwidth information between the network elements, calculation and creation of paths for connections, network level protection and restoration, and other control. In one or more embodiments of the invention, the control plane takeover logic (214) includes functionality to perform the Steps of FIGS. 3-5 in accordance with one or more embodiments of the invention.

The network element identifier (216) is a unique identifier of a network element (202) in the network. In other words, the network element identifier (216) is unique amongst network elements in the network or a subnet thereof. For example, the network element identifier may be a media access control (MAC) address, Internet Protocol (IP) address or other unique identifier of the network element.

Similarly, although not discussed above, ports on the network element (200) may have a corresponding unique identifier. In one or more embodiments of the invention, the unique identifier of the port may be unique amongst the ports on the network element (200) or unique amongst ports of a particular type (e.g., egress ports, optical ports, optical egress ports, etc.). In one or more embodiments, the port unique identifier, or unique identifier of the port, is assigned by the network element to the port. Other unique identifiers may be used without departing from the scope of the invention.

In addition to the components shown in FIG. 2, the network element (200) may include one or more hardware processor(s) (not shown), ports associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor.

Software instructions in the form of computer readable program code to perform one or more embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 3:
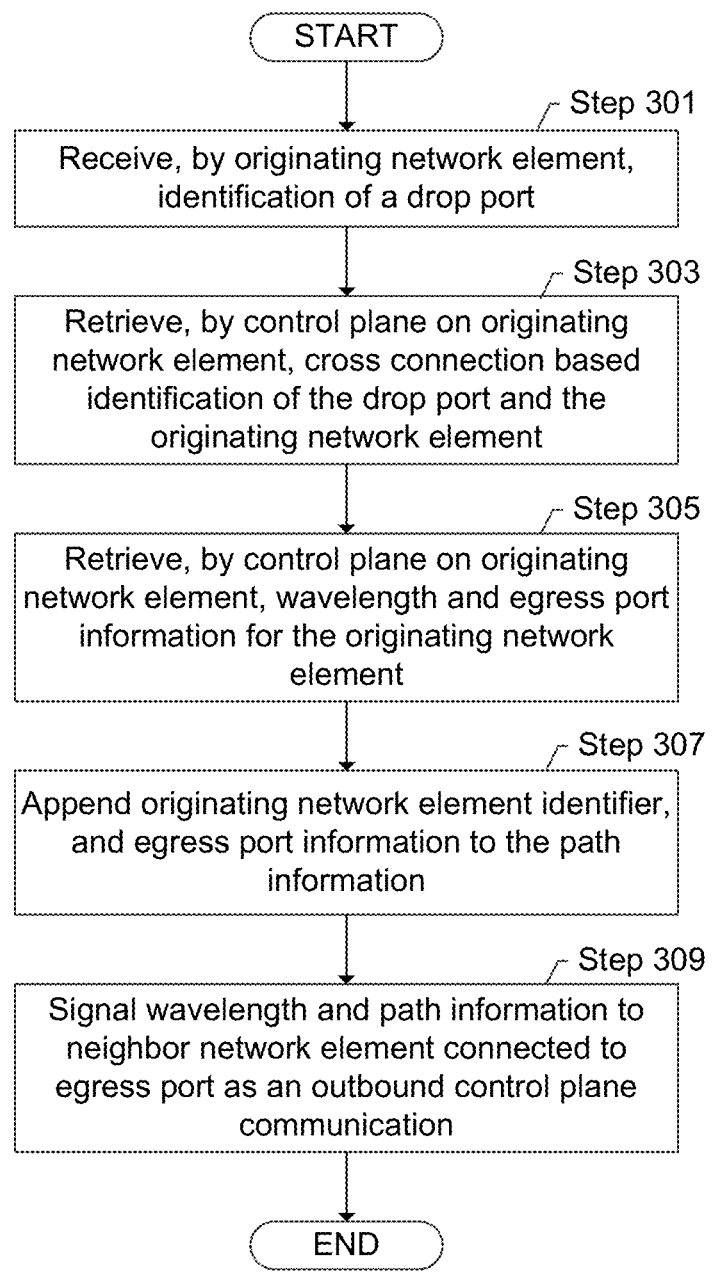
FIGS. 3-5 show flowcharts in accordance with one or more embodiments of the invention.
Figure 4:
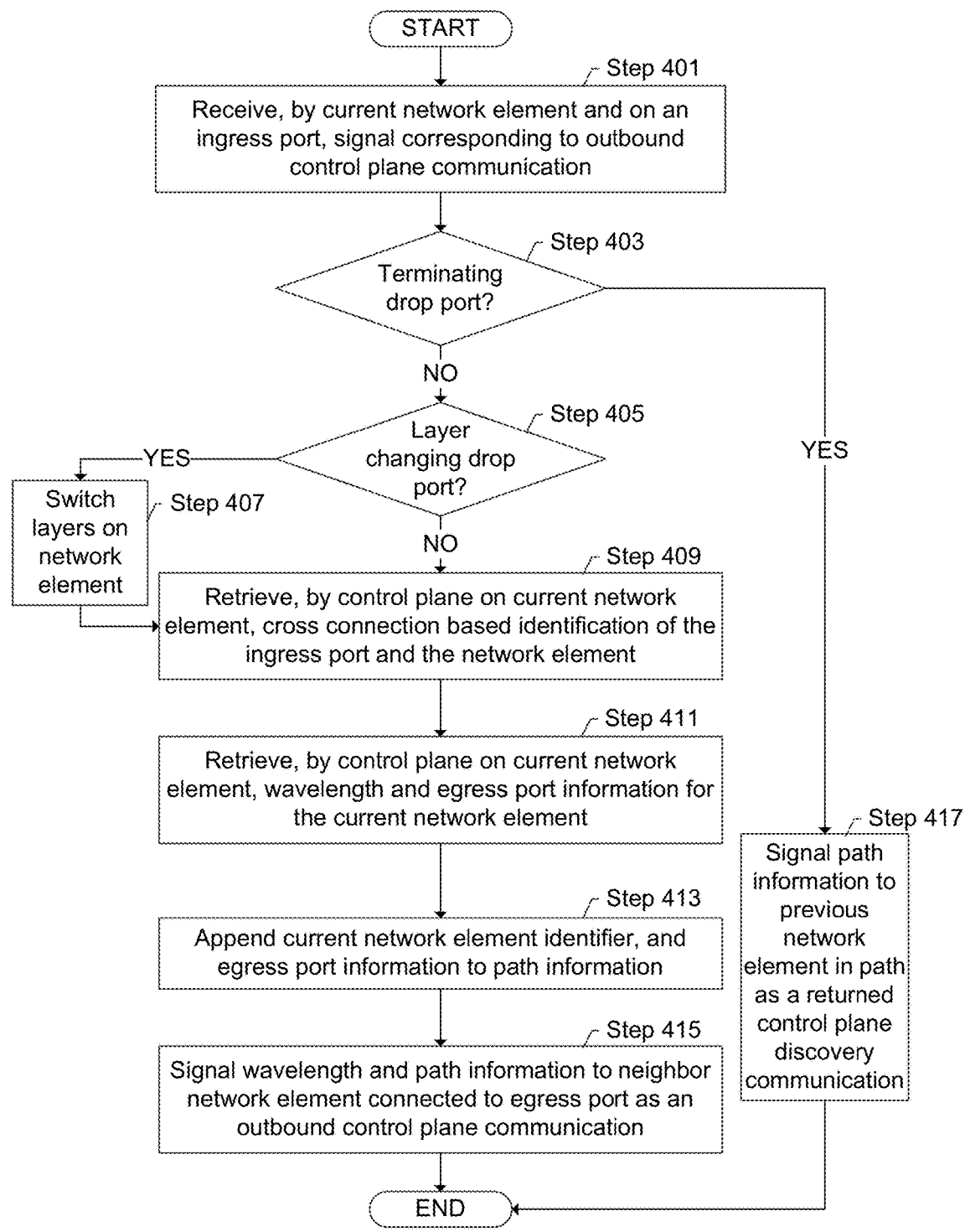
Figure 5:
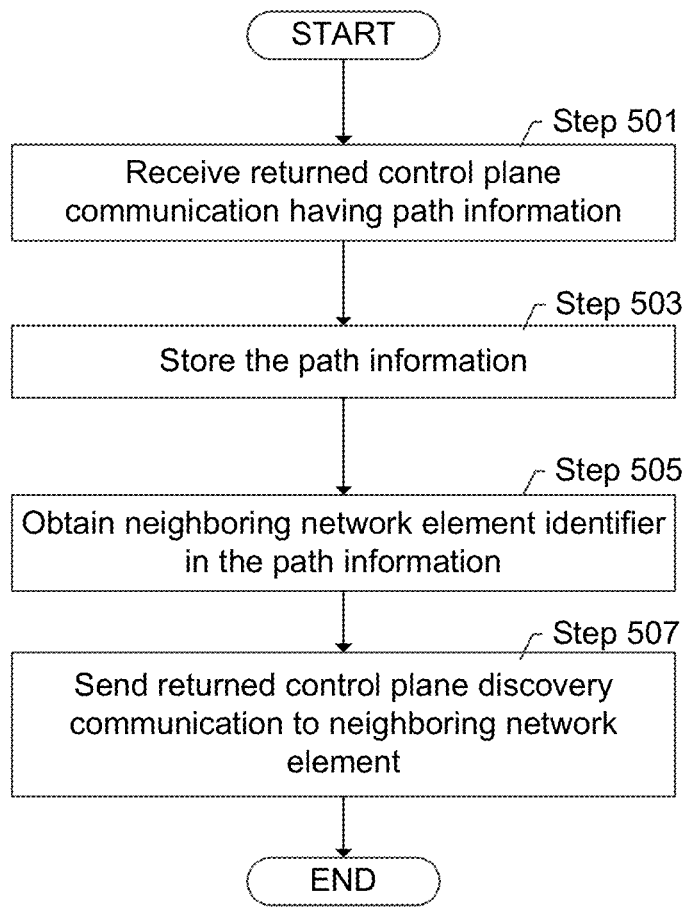

FIGS. 3-5 show flowcharts in one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart for an originating network element to initiate a control plane takeover for a service in accordance with one or more embodiments of the invention. In Step 301, an originating network element receives identification of a drop port. The drop port is the starting port for the service. In one or more embodiments, using a user interface of the network or the particular network element, a user may submit an identifier of the drop port and an identifier of the originating network element. The submission may be explicit (e.g., by selecting or inputting an identifier in a graphical user interface widget) or implicit (e.g., by accessing a graphical user interface of the network element to specify the drop port of the network element). In one or more embodiments of the invention, the control plane takeover may occur even when the user only submits the identifier of the drop port and the identifier of the originating network element. In other words, the multi-layer control plane takeover may occur with only the aforementioned pieces of information specified by the user.

In Step 303, the control plane on the originating network element retrieves cross connection information based on the identification of the drop port and the originating network element in accordance with one or more embodiments of the invention. In other words, the control plane takeover logic of the control plane may access the ingress to egress mapping to obtain the cross connection information. In one or more embodiments of the invention, the cross connection information is stored locally at the network element, but not for the control plane. By accessing one or more local data structures with the drop port identifier for the originating network element, the control plane may identify the cross connection corresponding to the drop port.

In Step 305, the control plane on the originating network element retrieves wavelength and egress port information for the originating network element in accordance with one or more embodiments of the invention. From the cross connection information, the control plane identifies the egress port of the originating network element corresponding to the cross connect. The control plane further determines the wavelength for the service. Because the network is a DWDM network prior to the takeover, the wavelength of the service is predefined and may be identified from local data structures.

In Step 307, the control plane on the originating network element appends an originating network element identifier and egress port information to the path information. In one or more embodiments of the invention, the path information maintains the path through the network in order. The originating network element may append the originating network element identifier and egress port information to the path information by creating a new data structure for the path information. The originating network element may then add the network element identifier and egress port information to the new data structure.

In Step 309, the control plane on the originating network element signals the wavelength and path information to the network element connected to the egress port as a transmission control plane discovery communication in accordance with one or more embodiments of the invention. In one or more embodiments of the invention, the transmission control plane discovery communication is a signal that is sent to perform the discovery and includes the path information. The control plane causes the egress port defined by the egress port identifier to send the transmission control plane discovery communication as a signal in the corresponding wavelength. The signal is sent to an ingress port of a neighboring network element (e.g., the next network element in the path that has an ingress port corresponding to the egress port). The neighboring network element may process the signal using the technique described below with reference to FIG. 4. In other words, the neighboring network element may be an intermediate network element with respect to the path and the service.

FIG. 4 shows a flowchart for an intermediate or terminating network element to manage control plane takeover for a service in accordance with one or more embodiments of the invention. The Steps of FIG. 4 may be performed by each network element in order until the terminating network element is reached. As each network element receives and processes the transmission control plane discovery communication, the network element may be referred to as the current network element in FIG. 4. In Step 401, a current network element receives a signal corresponding to a transmission control plane discovery communication on an ingress port in accordance with one or more embodiments of the invention. In one or more embodiments of the invention, the current network element receives the communication by having an ingress port corresponding to the egress port of the previous network element in the path. The ingress port may be an optical layer ingress port or an electrical layer ingress port depending on the egress port that sent the transmission control plane discovery communication.

In Step 403, a determination is made whether the ingress port corresponds to a terminating drop port in accordance with one or more embodiments of the invention. In other words, the determination is made whether the network element is a terminating network element, such as an edge device for the service on the network. Because the network is a DWDM network prior to the takeover, whether the ingress port corresponds to a terminating drop port is predefined and may be identified from local data structures that are local on the current network element. Thus, by accessing local data structures, the determination may be made whether the ingress port corresponds to a terminating drop port. If the ingress port corresponds to a terminating drop port, the flow may proceed to Step 417 of FIG. 4 (discussed below).

Continuing with FIG. 4, in Step 405, a determination is made whether the ingress port corresponds to a layer changing drop port in accordance with one or more embodiments of the invention. A layer changing drop port does not terminate the service, but rather switches from an optical layer to an electrical layer service or from an electrical layer to an optical layer service. For example, the current network element may correspond to a regenerating network element that regenerates the optical signal. One or more embodiments not only discover the services on the optical layer, but also on one or more electrical layer(s) so that the control plane takeover of a service may be performed on the layers of the service. By not treating the layer changing drop port as a terminating drop port, the takeover may continue and the user does not have to restart the takeover. Because the network is a DWDM network prior to the takeover, whether the ingress port corresponds to a layer changing drop port is predefined and may be identified from local data structures that are local on the current network element. Thus, by accessing local data structures, the determination may be made whether the ingress port corresponds to a layer changing drop port. If the ingress port corresponds to a terminating drop port, the flow may proceed to Step 407.

In Step 407, if the ingress port corresponds to a layer changing drop port, then the flow may proceed to switch layers on the network element. In other words, if the layer changing is from an optical layer to an electrical layer, then the flow may continue with the electrical layer rather than the optical layer. If the layer changing is from an electrical layer to an optical layer, then the flow may continue with the optical layer rather than the electrical layer. Further, information about the changing layers may be appended to the path information. For example, a code or other notation may be added to the path information that indicates that the current network element corresponds to a regeneration network element, the layer change occurs at the current network element, or other notation. By appending the notation to the path information, the network elements in the path may be informed of the layer change.

Regardless of whether the ingress port corresponds to a layer changing drop port, in Step 409, the control plane on the current network element retrieves cross connection based on an identification of the ingress port and the network element in accordance with one or more embodiments of the invention. Step 409 may be performed in a same or similar manner to Step 303 of FIG. 3 discussed above.

In Step 411, the control plane on the current network element retrieves wavelength and egress port information for the current network element in accordance with one or more embodiments of the invention. Step 411 may be performed in a same or similar manner to Step 305 of FIG. 3 discussed above. However, in Step 411, if the current layer is an electrical layer, rather than the wavelength, the frequency of the signal may be determined. In one or more embodiments, the frequency of the signal may correspond to the service and may be identified using a same or similar technique to identifying the wavelength of the optical signal.

In Step 413, the control plane on the current network element appends a current network element identifier and egress port information to the path information in the transmission control plane discovery communication. Step 411 may be performed in a same or similar manner to Step 307 of FIG. 3 discussed above. For an intermediate or terminating network element, the network element adds the current network element identifier and egress port information to the received path information. The added current network element identifier and egress port information is performed so as to maintain an ordering of the path in the path information. For example, appending the current network element identifier and egress port information may be at the end of the path information received, at the beginning (in case a reverse order is used), or with an order identifier, such as a numeric identifier that specifies an order.

In Step 415, the control plane on the current network element signals the wavelength and path information to the network element connected to the egress port as an outbound control plane communication in accordance with one or more embodiments of the invention. Step 415 may be performed in a same or similar manner to Step 309 of FIG. 3 discussed above. However, in Step 415, if the current layer is an electrical layer, rather than the wavelength, the frequency of the signal may be transmitted via the electrical egress port. Thus, the flow proceeds with performing the Steps of FIG. 4 by the neighbor network element. In other words, each network element in the path performs the Steps of FIG. 4. Thus, the overall flow goes hop by hop through the network to discover the path of a service.

Returning to Step 403, if the ingress port corresponds to a terminating drop port, then the flow proceeds to Step 417. In Step 417, path information is signaled to a previous network element in the path as a returned control plane discovery communication in accordance with one or more embodiments of the invention. In other words, the current network element is deemed the terminating network element for the service and the path information gathered is returned to each node in the path via the returned control plane communication. When the terminating network element is reached, the flow may proceed to FIG. 5.

FIG. 5 shows a flowchart for returning path information to each network element in the path in accordance with one or more embodiments of the invention. In Step 501, a current network element receives a returned control plane communication having path information. In other words, the current network element receives the returned control plane communication from the neighbor network element that the current network element had signaled in Step 309 of FIG. 3 or Step 415 of FIG. 4. In one or more embodiments of the invention, the returned control plane communication is sent in the same layer as the outbound control plane communication. The same or different ports may be used for the returned control plane communication as for the outbound control plane communication. For example, if the same port is both an ingress port and an egress port, then the same port may be used. By way of another example, an egress port may have corresponding ingress port that connects to the same neighbor network element. In such a scenario, the returned control plane communication is received on the corresponding ingress port.

In Step 503, the path information is stored in accordance with one or more embodiments of the invention. At this stage, the path information includes the complete path from the originating network element to the terminating network element for the service. The path information may be stored in non-volatile memory or storage device. Thus, the control plane of the current network element has the path information of the complete path and may use the path information to manage the network.

In Step 505, a neighbor network element identifier is obtained in the path information in accordance with one or more embodiments of the invention. In other words, if the current network element is not the originating network element, then the current network element forwards the complete path information back to the prior neighbor network element in the path. The prior neighbor network element is the network element from which the current network element directly received the outbound control plane communication. The port information for the neighbor network element and wavelength or frequency may be obtained the path information and a local data structure for the service, respectively. If the port information corresponds to an egress port only, the corresponding ingress port of the neighbor network element may be identified.

In Step 507, the returned control plane communication is sent to the neighbor network element in accordance with one or more embodiments of the invention. Sending the returned control plane communication may be performed similar to Step 415 of FIG. 4. In other words, the current network element signals the neighboring network element with the path information using an optical or electrical egress port as defined by the path information. Thus, the path information is propagated back hop by hop to the originating network element. When received by the originating network element, the originating network element may store the path information. As each network element stores the path information, the control plane is deemed to have taken over the service from the prior network manager. Thus, the control plane may manage the service using the stored path information.

Figure 6:
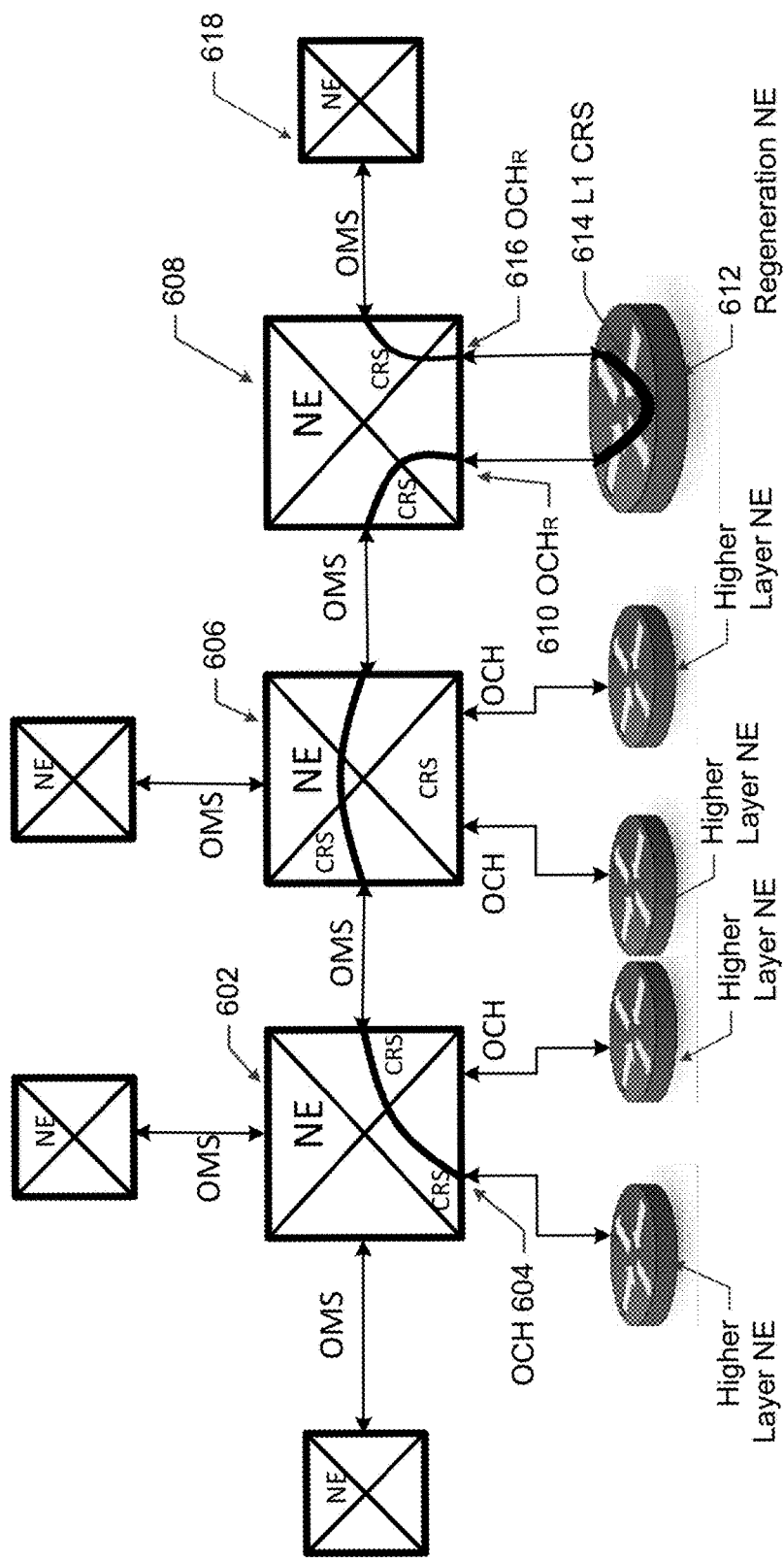
FIG. 6 shows an example in accordance with one or more embodiments of the invention.

FIG. 6 shows an example of a network and path in accordance with one or more embodiments of the invention. The following example is for explanatory purposes only and not intended to limit the scope of the invention. Various acronyms are used in the example FIG. 6. In particular, NE is network element, OCH is optical channel drop port, OMS is an optical multiplexing section (e.g., link) or a port between DWDM network elements that supports multiple channels, and CRS is a cross connection. A higher layer NE is a layer 1, layer 2 or other layer network element.

In the example in FIG. 6, a user specifies NE (602) and OCH (604) as the originating drop port. Thus, NE (602) is an originating network element. In response, the originating NE (602) obtains cross connection information of a cross connection on NE (602). NE (602) uses the cross connection to obtain corresponding egress port information. After appending the originating NE (602) identifier and egress port information to the path information, the originating NE (602) sends an outbound control plane communication to NE (606) via an optical link with the path information.

NE (606) obtains cross connection information of a cross connection on NE (606). NE (606) uses the cross connection to obtain corresponding egress port information. After appending the NE (606) identifier and egress port information to the path information, NE (606) sends an outbound control plane communication to NE (608) via an optical link with the updated path information.

NE (608) obtains cross connection information of a cross connection on NE (608). NE (608) uses the cross connection to obtain corresponding egress port information. Although the egress port information indicates that the corresponding egress port (610) is an optical drop port, additional mappings indicate that the drop port is a regeneration drop port rather than a terminating drop port. Thus, after appending the NE (608) identifier and egress port information to the path information, the NE (608) sends an outbound control plane communication to regeneration NE (610).

Regeneration NE (612) obtains layer 1 cross connection information of the layer 1 cross connection (614) on NE (612). NE (612) uses the cross connection to obtain corresponding egress port information for drop port (616). Thus, after appending the NE (616) identifier, a code indicating that the NE (612) is a regeneration NE, and egress port information to the path information, the NE (616) sends an outbound control plane communication back to NE (608) on a different egress port of regeneration NE (612) and ingress port (616). NE (608) may then continue the above steps to send the path information along the optical path to NE (618). When the terminating network element is reached, the path information is signaled back via NE (618), NE (608), regeneration NE (612), NE (608), NE (606), and NE (602). Thus, the control plane takeover is both an optical control plane takeover as well as an electrical control plane takeover.

Although FIG. 6 shows an example of an optical electrical optical cross connect, one or more embodiments may be used for taking over a control plane on an electrical layer while taking over the control plane on the optical layer. In other words, a single control plane may take over the electrical layer as well as the optical layer, so that the optical layer is effectively creating what looks like a virtual fiber between electrical layer switches. In other words, electrical layer may take over a service in both electrical layers as well as one or more times on optical layer. In such a scenario, the drop port and originating network element may be an electrical layer network element. The electrical layer network element may signal down to the optical layer and automatically take over the entire optical layer cross connects as well. Thus, if an entire electrical connection that involves several network elements is in the middle of a photonic (i.e., optical) connection of the path of the service, the control plane takeover logic takes over the electrical as well as the photonic connections. Conversely, using the techniques described above, if an entire photonic connection that involves several network elements is in the middle of an electrical connection of the path of the service, the control plane takeover logic takes over the photonic as well as the electrical connections. The takeover is performed even when the end user specifies only the network element and the drop port in accordance with one or more embodiments of the invention.

Thus, using the techniques described above, given only the originating node and drop port (e.g. User-Network Interface), the mechanism presented herein may automatically discover the wavelength of the service, the terminating network element and drop port, and all cross-connections (CRS) in between belonging to the service (including at regeneration sites the 2 layer 0 CRS and the 1 layer 1 CRS). Further, control plane signaling is routed according to the egress port indicated by the cross connection.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for control plane discovery comprising:
    transmitting, by a plurality of network elements, an outbound control plane communication to generate path information of a path through the plurality of network elements, wherein transmitting the outbound control plane communication comprises:
        receiving, by a first intermediate network element of the plurality of network elements, the outbound control plane communication on an optical layer ingress port,
        determining, based on a local data structure of the first intermediate network element, that the optical layer ingress port is a layer changing drop port of the path,
        appending, by the first intermediate network element, a first intermediate network element identifier of the first intermediate network element and information regarding the layer changing drop port to the path information in the outbound control plane communication, and
        transmitting, by the first intermediate network element using an electrical signal to a second intermediate network element of the plurality of network elements, the outbound control plane communication via an electrical layer egress port based on the optical layer ingress port being the layer changing drop port;
    receiving, by the plurality of network elements via the path, the path information via a returned control plane communication; and
    operating a control plane using the path information in the returned control plane communication.

2. The method of claim 1, further comprising:
    storing, in a designated transit list, the path information in the returned control plane communication.

3. The method of claim 1, further comprising:
    receiving, by an originating network element, identification of a drop port,
    wherein transmitting the outbound control plane communication further comprises:
        retrieving by a control plane on the originating network element, a cross connection information based on identification of the drop port,
        retrieving, by a control plane on the originating network element, a wavelength and egress port information of an egress port corresponding to the drop port,
        appending an originating network element identifier to the path information, and
        signaling, a neighboring network element connected to the egress port, with a wavelength and path information.

4. The method of claim 1, further comprising:
    receiving, by an edge network element of the plurality of network elements, the outbound control plane communication;
    determining that the ingress port corresponds to a terminating drop port;
    appending an edge network element identifier to the path information; and
    responding with the returned control plane communication to the path information.

5. The method of claim 1, wherein the electrical layer egress port is a layer 1 port.

6. The method of claim 1, wherein the electrical layer egress port is a layer 2 port.

7. The method of claim 1, wherein transmitting the outbound control plane communication further comprises:
    receiving, by the second intermediate network element from the first intermediate network element, the outbound control plane communication on an electrical layer ingress port,
    appending, by the second intermediate network element, a second intermediate network element identifier of the second intermediate network element to the path information in the outbound control plane communication, and transmitting, by the second intermediate network element, the outbound control plane communication via an optical layer egress port based on the second intermediate network element comprising a layer changing drop port.

8. The method of claim 7, wherein the second intermediate network element is connected via the electrical layer ingress port and the electrical layer egress port to the first intermediate network element, and wherein the first intermediate network element and the second intermediate network element are portions of a regeneration network element.

9. A system for control plane discovery in a network comprising a plurality of network elements, a first intermediate network element of the plurality of network elements comprising:

a hardware processor; and memory storing instructions, the instructions, when executed, causing the hardware processor to perform functionality comprising:

transmitting an outbound control plane communication to generate path information of a path through the plurality of network elements, wherein transmitting the outbound control plane communication comprises:

receiving, by a first intermediate network element of the plurality of network elements, the outbound control plane communication on an optical layer ingress port, determining, based on a local data structure of the first intermediate network element, that the optical layer ingress port is a layer changing drop port of the path, appending, by the first intermediate network element, a first intermediate network element identifier of the first intermediate network element and information regarding the layer changing drop port to the path information in the outbound control plane communication, and transmitting, by the first intermediate network element using an electrical signal to a second intermediate network element of the plurality of network elements, the outbound control plane communication via an electrical layer egress port based on the optical layer ingress port being the layer changing drop port;

receiving, by the plurality of network elements via the path, the path information via a returned control plane communication; and operating a control plane using the path information in the returned control plane communication.

10. The system of claim 9, wherein the functionality further comprises:

storing, in a designated transit list, the path information in the returned control plane communication.

11. The system of claim 9, wherein the functionality further comprises:

receiving, by an originating network element, identification of a drop port;

wherein transmitting the outbound control plane communication further comprises:

retrieving by a control plane on the originating network element, a cross connection information based on identification of the drop port, retrieving, by a control plane on the originating network element, a wavelength and egress port information of an egress port corresponding to the drop port, appending an originating network element identifier to the path information, and signaling, a neighboring network element connected to the egress port, with a wavelength and path information.

12. The system of claim 9, wherein the functionality further comprises:

receiving, by an edge network element of the plurality of network elements, the outbound control plane communication;

determining that the ingress port corresponds to a terminating drop port;

appending an edge network element identifier to the path information; and responding with the returned control plane communication to the path information.

13. The system of claim 9, wherein the electrical layer egress port is a layer 1 port.

14. The system of claim 9, wherein the electrical layer egress port is a layer 2 port.

15. The system of claim 9, wherein transmitting the outbound control plane communication further comprises:

receiving, by the second intermediate network element from the first intermediate network element, the outbound control plane communication on an electrical layer ingress port, appending, by the second intermediate network element, a second intermediate network element identifier of the second intermediate network element to the path information in the outbound control plane communication, and transmitting, by the second intermediate network element, the outbound control plane communication via an optical layer egress port based on the second intermediate network element comprising a layer changing drop port.

16. The system of claim 15, wherein the second intermediate network element is connected via the electrical layer ingress port and the electrical layer egress port to the first intermediate network element, and wherein the first intermediate network element and the second intermediate network element are portions of a regeneration network element.

17. An intermediate network element comprising:

a hardware processor; and memory storing instructions, when executed, causing the hardware processor to perform functionality comprising:

transmitting an outbound control plane communication to generate path information of a path through a plurality of network elements comprising the intermediate network element and a neighboring network element of the intermediate network element, wherein transmitting the outbound control plane communication comprises:

receiving, by the intermediate network element the outbound control plane communication on an optical layer ingress port, determining, based on a local data structure of the intermediate network element, that the optical layer ingress port is a layer changing drop port of the path, appending, by the intermediate network element, an intermediate network element identifier of the intermediate network element and information regarding the layer changing drop port to the path information in the outbound control plane communication, and transmitting, by the intermediate network element using an electrical signal to the neighboring network element, the outbound control plane communication via an electrical layer egress port based on the optical layer ingress port being the layer changing drop port;

receiving, via the path, the path information via a returned control plane communication; and operating a control plane using the path information in the returned control plane communication.

18. The intermediate network element of claim 17, wherein the functionality further comprises:

storing, in a designated transit list, the path information in the returned control plane communication.

19. The intermediate network element of claim 17, further comprising functionality for:

receiving, by an edge network element of the plurality of network elements, the outbound control plane communication;

determining that the ingress port corresponds to a terminating drop port;

appending an edge network element identifier to the path information; and responding with the returned control plane communication to the path information.

20. The intermediate network element of claim 17, wherein the electrical layer egress port is a layer 1 port.

* * * * *